United States Patent
Kobayashi

(10) Patent No.: US 6,954,632 B2
(45) Date of Patent: Oct. 11, 2005

(54) HOME NETWORK SYSTEM

(75) Inventor: Shinji Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 351 days.

(21) Appl. No.: 10/130,560

(22) PCT Filed: Sep. 27, 2001

(86) PCT No.: PCT/JP01/08449

§ 371 (c)(1),
(2), (4) Date: Oct. 1, 2002

(87) PCT Pub. No.: WO02/27503

PCT Pub. Date: Apr. 4, 2002

(65) Prior Publication Data

US 2003/0054798 A1 Mar. 20, 2003

(30) Foreign Application Priority Data

Sep. 27, 2000  (JP) ........................................ 2000-294568

(51) Int. Cl.$^7$ ............................................. H04M 1/66
(52) U.S. Cl. .................... 455/411; 455/410; 455/435.1; 455/435.2; 455/435.3; 455/422.1; 370/247; 370/248; 370/249; 370/250; 379/161; 379/194; 379/189
(58) Field of Search ................... 455/411, 435.1–435.3, 455/422.1, 410, 445, 466; 379/161, 194, 189; 380/247–250; 370/401; 709/204, 224

(56) References Cited

U.S. PATENT DOCUMENTS

| 5,548,646 | A | * | 8/1996 | Aziz et al. .................. 713/153 |
| 6,134,431 | A | * | 10/2000 | Matsumoto et al. ........ 455/411 |
| 6,173,399 | B1 | * | 1/2001 | Gilbrech ...................... 713/153 |
| 6,381,651 | B1 | * | 4/2002 | Nishio et al. ............... 709/245 |
| 6,496,704 | B2 | * | 12/2002 | Yuan .......................... 455/466 |
| 6,768,743 | B1 | * | 7/2004 | Borella et al. ............. 370/401 |
| 6,782,413 | B1 | * | 8/2004 | Loveland .................... 709/204 |
| 6,795,918 | B1 | * | 9/2004 | Trolan ........................ 713/160 |
| 6,839,553 | B2 | * | 1/2005 | Park .......................... 455/411 |
| 2001/0041571 | A1 | * | 11/2001 | Yuan .......................... 455/445 |
| 2003/0033401 | A1 | * | 2/2003 | Poisson et al. ............. 709/224 |

* cited by examiner

Primary Examiner—Sonny Trinh
Assistant Examiner—Khai Nguyen
(74) Attorney, Agent, or Firm—Jay H. Maioli

(57) ABSTRACT

A home network system that makes it possible to build a network with assured security, wherein network users need not have security expertise. For access attempts offered from a home node 21-1 in a community area network 5-1 toward an outside public network 1 through a path N2, a security server 11-1 need not execute an authentication process. The home node 21-1 rejects access attempts directly transferred from the public network 1. The security server 11-1 executes the authentication process for an access attempt transferred from the public network 1 through a path N42. When the authentication is successful, connection of the access attempt to the home node 21-1 through a path N9 is permitted.

8 Claims, 7 Drawing Sheets

HOME NETWORK SYSTEM

TECHNICAL FIELD

The present invention relates to a home network system.

BACKGROUND ART

In the past, since it was seldom that general network service users at home keep their machine connecting to a public network all the time, they were little conscious of network security.

Conventionally, corporate network security management has been performed, using firewalls or the like.

It is substantially impossible for general home users to provide their machine or system with a firewall and carry out firewall operation and maintenance for which a lot of technical expertise is required If general household computers and equipment keep connecting to a public network all the time without being protected by a firewall, it is easy for a third party to intrude into the intra-home network. Consequently, there is a possibility that secret information such as a password, credit ID and ID for electronic commerce (EC) be stolen.

Even when general household computers and equipment keep connecting to a public network all the time via a router, filtering can be performed, but personal authentication or the like must be performed separately. Because building an authentication system requires technical expertise, it is substantially impossible for general home users to use authentication management.

When a cellular mobile device operating outdoors is accessing a network device installed in a home, the absence of an authentication system is a bottleneck of security, so that it will be impossible to remotely operate a crime prevention and security system and download data from a server in the home.

Telephonic communication via networks using Voice over IP (VoIP) or the like is normally arranged such that a subscriber calls another subscriber connecting to a connection server except intra-corporate use thereof. The subscriber, however, cannot call another subscriber that is not connecting to the connection server, which is different from general telephony systems in which calling another subscriber by dialing its telephone number makes the connection thereto.

At the present, when connecting computers and equipment to a public network such as the Internet all the time, a connection device such as a router is used for filtering and connection control or a firewall is installed on a large scale. In this case, because individual devices in a network are concealed, receiving push-type information distribution is generally difficult, requiring knowledge of networking.

DISCLOSURE OF THE INVENTION

In view of the above network usage situation of general users, the object of the present invention is to allow even general users who are not familiar with security expertise to communicate with the outside world with assured security that is provided in a simple and dependable way.

In one implementation of the present invention, a home network system including first and second networks is provided. The network system comprises detection means for detecting the direction of access between the first network and the second network; storage means for storing information required for executing an authentication process; authentication means for executing the authentication process, based on the information stored in the storage means, when the detection means has detected an access attempt in the direction from the first network toward the second network; and control means for controlling connection of an access attempt from the first network toward the second network, according to the result of authentication executed by the authentication means.

The authentication means can be configured not to execute the authentication process when the detection means has detected an access attempt in the direction from the second network toward the first network.

The control means can be configured to control connection, using VPN.

The second network can be configured to accommodate a plurality of home nodes of individual networks formed inside each home.

The individual networks formed inside each home can be configured to include Ethernet or IEEE1394.

The authentication means can be configured to execute the authentication process, using a telephone number or a device ID obtained from a wireless mobile device.

The storage means can be configured to further store information required for push-type distribution of information received across said first network to the home nodes over said second network.

The information to be distributed by the push-type distribution includes advertising or public relations, information from a government office, disasters information, or emergency information.

In another implementation of the present invention, a connection control method in a home network system including first and second networks is provided. The connection control method comprises the steps of detecting the direction of access between the first network and the second network; storing beforehand information required for executing a authentication process; executing the authentication process, based on the information thus stored, upon the detection of an access attempt in the direction from the first network toward the second network; and controlling connection of an access attempt from the first network toward the second network, according to the result of authentication.

Under a home node included in the network system of the present invention, a network system is built in which intra-home computers and equipment are interconnected. In this network system, a bridge or the like is used to connect networks of different physical layers, running different protocols, so that inter-network communication can be performed.

The home node can be embodied in a device such as a router that is capable of routing and filtering data to be communicated and can be configured to be able to keep connecting to the outside network all the time.

By adding a connection control to the above device, the node can be configured to be able to keep connecting to the outside network all the time.

The above device can be configured to have the functions of controlling connection from the outside and enabling connection from a reliable device, using a VPN technique or the like.

A community area network included in the present invention is formed to accommodate a plurality of nodes at homes (including condominiums, apartment houses, etc.) or in a residential area. A wide area community network included in the present invention is comprised of a plurality of community area networks.

The network system of the present invention can be configured to include servers for diverse services such as a content distribution mirror server and an advertising distribution server, and moreover, a security server for maintaining security.

In the wide area community network included in the present invention, the security server executes user authentication for connection attempts from the public network and sets up connection to the target node such as the router or gateway of the intra-home network of the user, using the VPN technique or the like.

In the wide area community network included in the present invention, when a connection attempt is offered from a mobile terminal device such as a cellular phone or PDA via the public network, the device identifying information such as the telephone number and the device ID is transferred to the security server where the information is then used for user authentication.

In a community area network of certain coverage in the wide area community network included in the present invention, the security server supervises and records traffic and the statuses of the connection devices such as the routers, and issues an alarm in case of a trouble occurring and performs troubleshooting and analysis, thereby ensuring security.

BEST MODE FOR CARRYING OUT THE INVENTION

Figure 1:
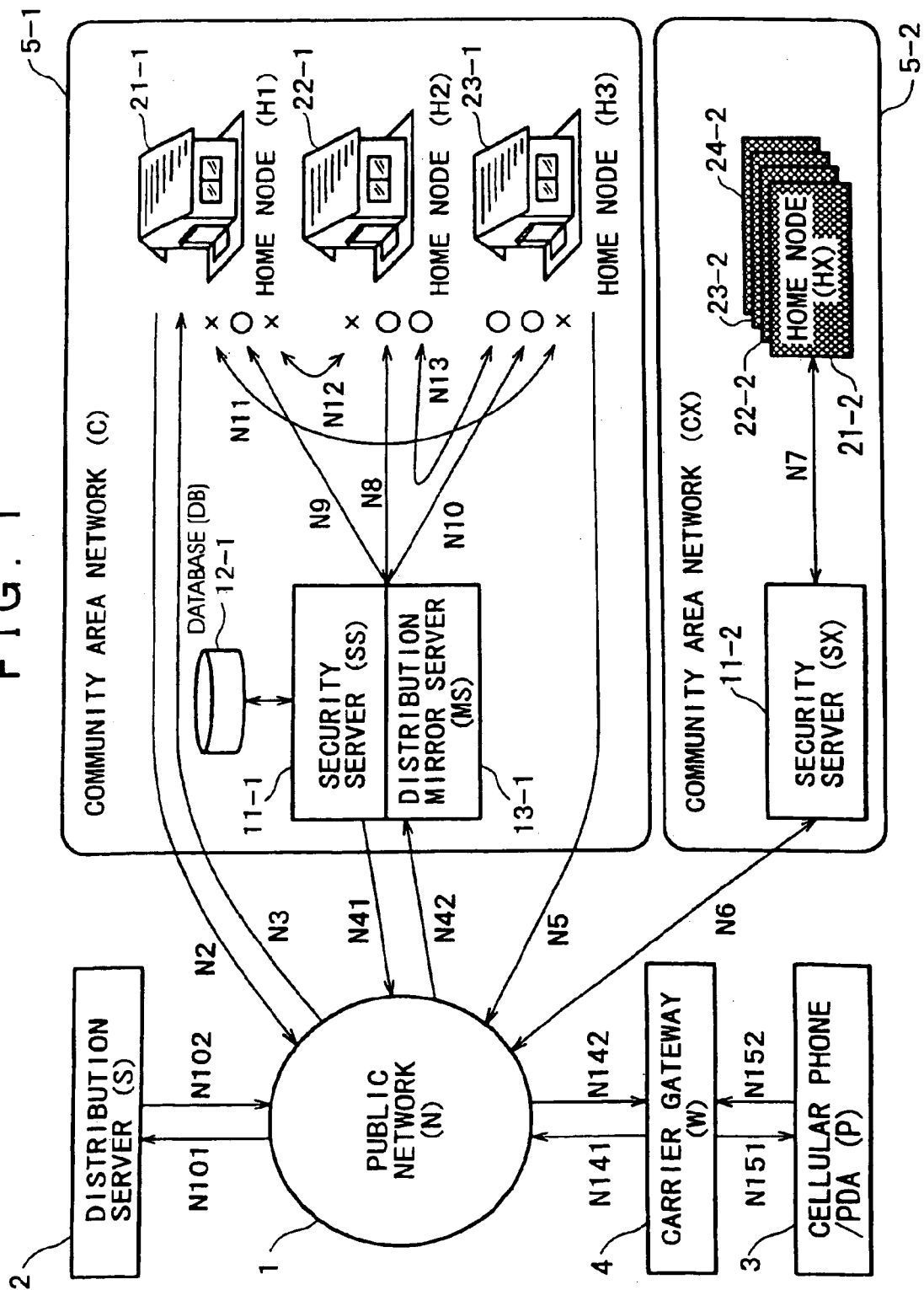
FIG. 1 is a block diagram showing a network system to which the present invention is applied.

FIG. 1 shows a basic exemplary structure of a network system to which the present invention is applied.

In the network system configured as shown in FIG. 1, a public network 1 such as, typically, the Internet, and a distribution server for distributing content or the like are connected by paths N101 and N102 and a wireless mobile device 3 such as a cellular phone or a Personal Digital Assistant (PDA) is connected to the public network 1 via a carrier gateway 4, using paths N141, N142, N151, and N152.

A community area network 5-1 which is included in the system as an inward network may be formed, depending on a geographical area to cover a residential area, condominiums, or apartment houses, or formed in a geographically independent network provided by an Internet Service Provider (ISP).

In the community area network 5-1, a security server 11-1 for providing and maintaining security and a distribution mirror server 13-1 for distributing content in high-quality mode inward the community area network 5-1 are installed, together with a database 12-1 for retaining authentication data and profiles for obtaining access to a home node.

The distribution mirror server 13-1 cashes and mirrors content delivered from the distribution server 2 to be distributed inward the community area network 5-1.

The distribution mirror server 13-1 may be unnecessary in the community area network 5-1, according to the communication line usage conditions of the network 5-1.

When the security server 11-1 receives a request for access to any home node in the community area network 5-1, transferred across the pubic network 1 and through a path N42, the server 11-1 authenticates the device that issued the access request by comparing the device ID (its unique ID, telephone number, etc.) and a password with the corresponding data within the database 12-1, thus determining whether the device can obtain the access.

In the network system example shown in FIG. 1, another community area network 5-2 of the same structure as the community area network 5-1 is also connected to the public network 1.

When a home node is accessing the distribution server 2 via the public network 1, the connection between the home node and the distribution server is made as follows. For example, a home node 21-1 is connected to the public network 1 by a path N2 and then connected to the distribution server 2 by a path N101 from the public network 1 thereto. Accordingly, the security server 11 is not used substantially for access from the community area network 5-1 to the external (even if it is used, authentication need not be performed).

After the above connection is made, if packets are transmitted by, for example, Transmission Control Protocol/Internet Protocol (TCP/IP), the first packet includes the SYN bit that is set and the ACK bit that is reset.

Reply from the distribution server 2 is sent across the path N102, pubic network 1, and path 3 to the home node 21-1.

For reply packets transferred by, for example, TCP/IP, the SYN bit is set and the ACK bit is set.

Thereafter, for packets to be communicated through the established connection, the ACK bit is set.

Unless the home node 21-1 initiates communication, packets from the public network 1 first passes across the path N3 to the home node 21-1 and its first packet includes the SYN bit that is set and the ACK bit that is reset when communication begins.

On the home node 21-1, there is a router 61 (which is included in FIG. 2 to be described later) that can determine which is the home node 21-1 or the public network 1 that is the origin of the flow of packets to be communicated, according to the direction of transfer (destination address) of the first packet including the ACK bit that is reset.

When the router 61 determines that access to the home node 21-1 is attempted from the public network 1, it can reject intrusion from the public network 1 by rejecting the connection.

When a user authorized to access the home node 21-1 attempts to access the home node 21-1 from the outside, carriers are first transmitted from the wireless mobile device 3 such as a portable phone or PDA via a radio channel path N152 to the carrier gateway 4 and the communication channel is thus set up.

At the carrier gateway 4, a protocol conversion process is performed to enable communication over the public network 1. The wireless mobile device is connected to the public network 1 by a path N141 and then connected to the security server 11-1 by a path N42.

As described above, the security server 11-1 authenticates the wireless mobile device 3, based on its device ID and a password. When the authentication is successful, the wireless mobile device is connected to the node to terminate, for example, the home node 21-1, through a path N9, according the profile stored in the database 12-1, whereina Virtual Private Network (VPN) technique or the like is used.

The home node 21-1 (router 61) permits the connection only when the reliable security server 11-1 requests it to make the connection, using the VPN technique or the like, and the connection is established by the path N9.

In the above-described manner, connection from a device operating outside to the home node 21-1 can be made.

When information is distributed by push-type distribution, it is sent from the distribution server 2 across the path N102, public network 1, and path N 42 to the security server 11-1.

The security server 11-1 determines whether the information is to be distributed, according to pre-registered information in the database 12-1. If the information is to be distributed, it is distributed to the home nodes and equipment, using the VPN technique or the like, based on the information arranged for distribution or the pre-registered information in the database 12-1. In this way, localized advertising, or public relations, information from a government office, emergency information, disasters information, etc. can be distributed by push-type distribution. For this purpose, in the database 12-1, information required for the security server to determine whether to permit push-type distribution must be registered beforehand.

In the community area network 5-1, in principle, connection between the home nodes, for example, the home node 21-1 and the home node 22-2, must not be made for communication.

Therefore, each home node (router 61) need to reject connection from other home nodes in the same community area network 5-1, for example, connection by a path N12 (for communication between the home node 21-1 and the home node 22-1) and a path N11 (for communication between the home node 21-1 and the home node 23-1) for access attempts for communication from the external, as for access attempts from the public network 1.

However, there is exception. Assume that, for example, for the home node 22-1 and the home node 23-1, the other node address is appointed as the address to contact in case of emergency. When the home node 22-1 transmits emergency information to the security server 11-1, the security server 11-1 connects to the home node 23-1, using the VPN technique or the like, based on the information registered in the database 12-1, and sends the emergency information to the home node 23-1 and specified equipment by push-type distribution.

In this way, mutual assistance in case of emergency is made possible in the community area network 5-1.

Figure 2:
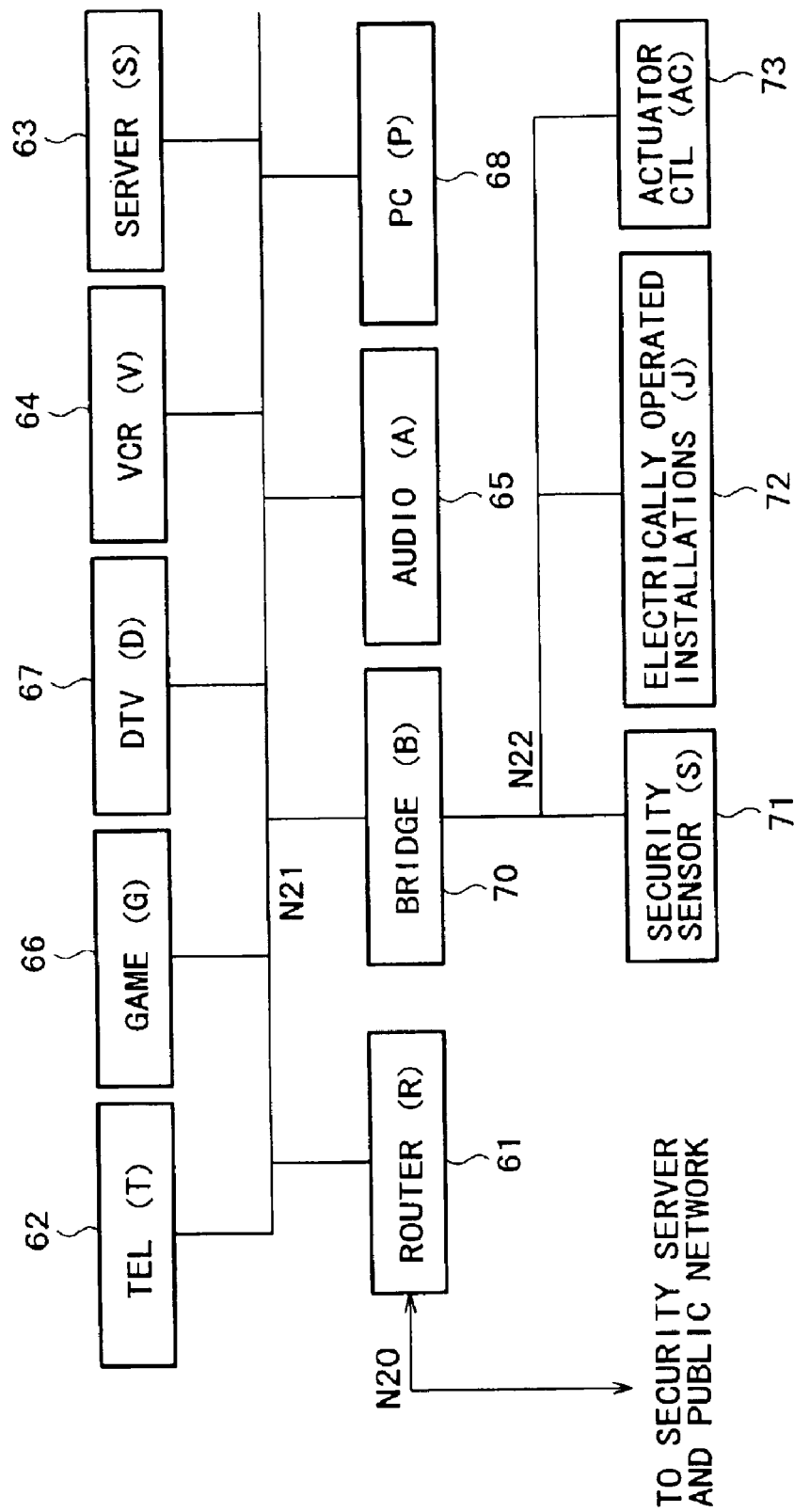
FIG. 2 is a block diagram showing an exemplary structure of an intra-home network.

FIG. 2 shows a basic exemplary structure of an intra-home network formed under one of the home nodes constituting the community area network 5-1 or 5-2 in FIG. 1.

For example, a path N 21 forming part of the intra-home network, is connected to the public network 1 and the security server 11-1 via the router 61 and across the path N 20.

The router 61 is provided with a fundamental filtering function by set conditions of address, port, input/output, etc., and implements the above-described filtering function, a function of receiving connection requests only from a specific reliable device (the security server 11-1 in the example case of FIG. 1), and a tunneling function such as VPN.

Furthermore, the router 61 has an address/port translation function, a Quality of Service (QoS) function if it can handle streaming, a HUB function if necessary, and device discovery functions such as Domain Name System (DNS) and Dynamic Host Configuration Protocol (DHCP).

The path N21 is a high-speed network part serving as an intra-home backbone, for example, Ethernet (a trademark) or the like is used for this path.

The path N21 as the high-speed network part is provided with a VoIP function. To the path N21, the following are connected: a telephone (TEL) 62 that enables communication via the networks; a server 63 for recording, reproducing, and redistributing streams and data; a video cassette recorder (VCR) 64 that records streams and data on tape or disk media, reproduces them therefrom, and redistributes them; an audio device 65 that receives streaming audio or network radio broadcasting and redistributes it; a game device 66 that supports games to play across people joined in via the network; a digital television receiver (DTV) 67 that receives streaming broadcasts and displays pictures; a personal computer (PC) 68; and so on.

A path N22 forms a low-speed part of the intra-home network. To the path N22, the following are connected: a security sensor 71 for prevention of crime and fire; electrically operated installations 72 such as a hot water supply system, lighting, and a power feed system; and an actuator controller 73 for controlling door lock/unlock and other mechanisms using an actuator; and so on.

The above equipment and installations are connected to the path N21 as the high-speed network part by a bridge 70 and the bridge 70 executes protocol conversion, physical medium conversion, and the like.

Figure 3:
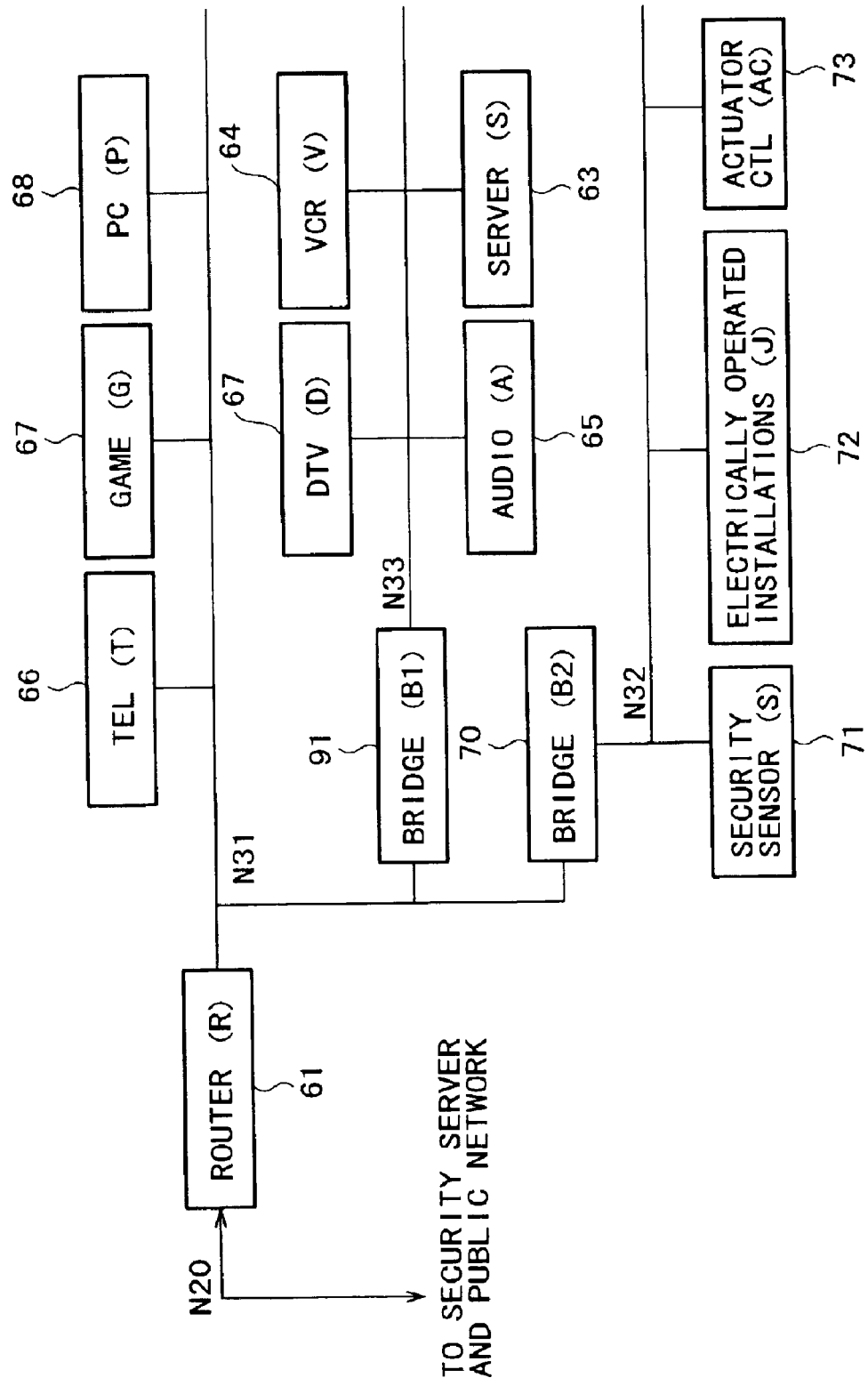
FIG. 3 is a block diagram showing another exemplary structure of an intra-home network.

FIG. 3 shows another exemplary structure of an intra-home network formed under one of the home nodes constituting the community area network 5-1 or 5-2 in FIG. 1. In this example, a specialized network such as, for example, IEEE1394, directed to a specific use is further connected to the network shown in FIG. 2.

A path N33 forms a network for an AV system; the network is embodied in, for example, IEEE1394. A path N31 serves as an intra-house backbone as the path N21 does, and is embodied in, for example, Ethernet.

The path N33 is connected to the path N31 by a bridge 91 and the bridge 91 executes protocol conversion, physical medium conversion, and the like between the path N33 and the path N 31.

By applying this manner of connecting different kinds of networks via a bridge, an intra-house network can flexibly be adapted to advanced technology.

Figure 4:
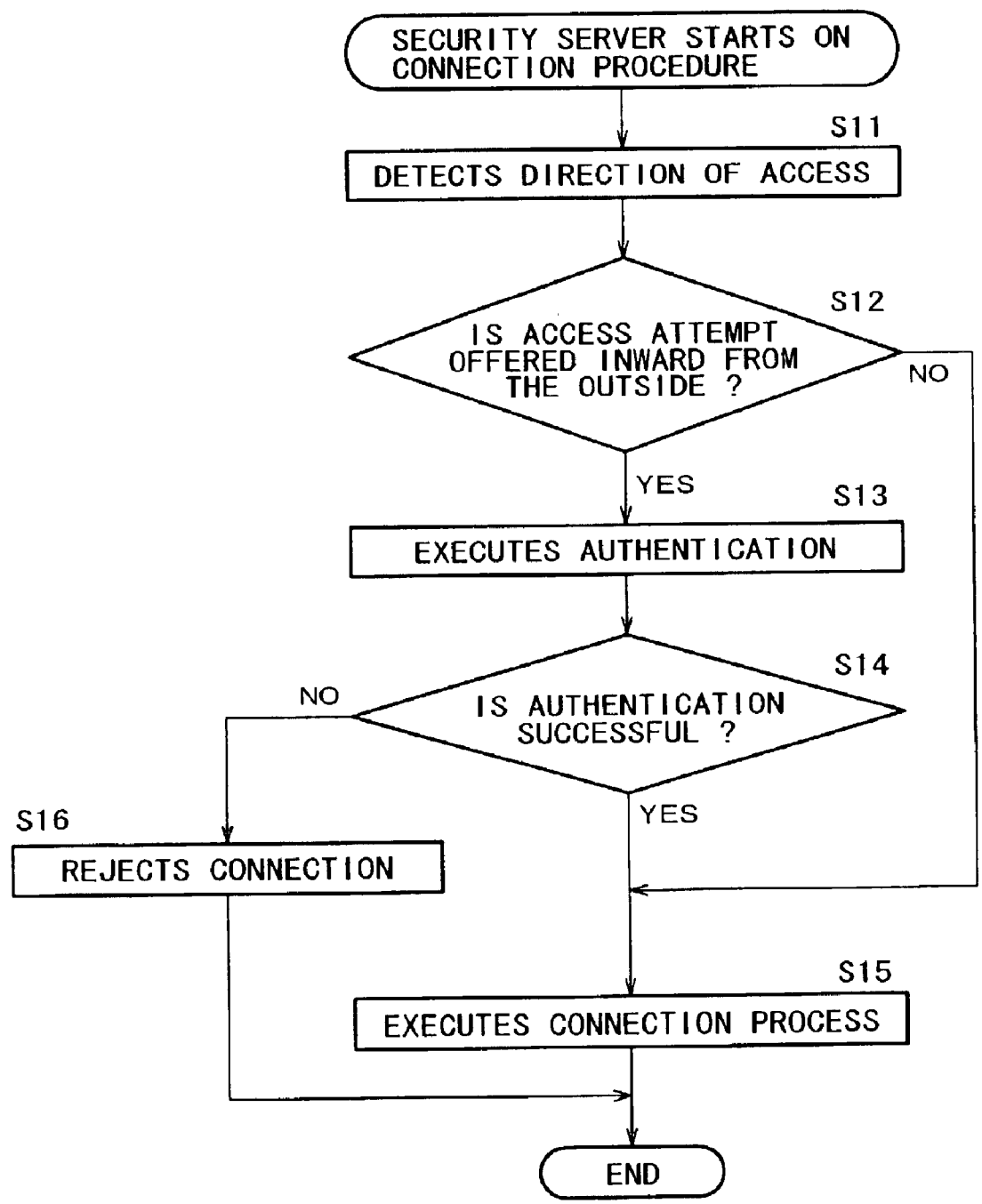
FIG. 4 is a flowchart explaining a connection procedure to be executed by a security server.

The security server 11-1 executes a connection procedure that is summarized in a flowchart shown in FIG. 4. In step S11, the security server 11-1 detects the direction of access. That is, the server detects an access attempt that is offered in the direction from the community area network 5-1 toward the public network 1 or in the reverse direction from the public network 1 toward the community area network 5-1 (access inward from the outside). According to the direction detected in the step S11, the security server 11-1 determines whether the access attempt is offered inward from the outside in step S12. If the access attempt is offered inward from the outside, the security server 11-1 goes to step S13 and executes the above-described authentication process. For authentication, for example, the telephone number and device ID obtained from the wireless mobile device 3 that offered the access attempt are compared with the corresponding data registered in the database 12-1 as described above.

In step S14, the security server 11-1 determines whether the authentication is successful. If the authentication is successful, the security server 11-1 goes to step S15 and executes the connection process. That is, the security server 11-1 executes processing for connecting the external device that offered the access attempt over the public network 1 to a home node 21-1 and equipment. This processing corresponds to the connection setup with the paths N42 and N9.

If the authentication is unsuccessful in the step S14, the security server 11-1 goes to step S16 and rejects connection.

If, at the step S12, it is determined that the access attempt is offered from inward to the outside, the security server 11-1 skips the step S13, goes to the step S15, and immediately executes the connection process. This processing corresponds to the connection setup with the path N2.

Figure 5:
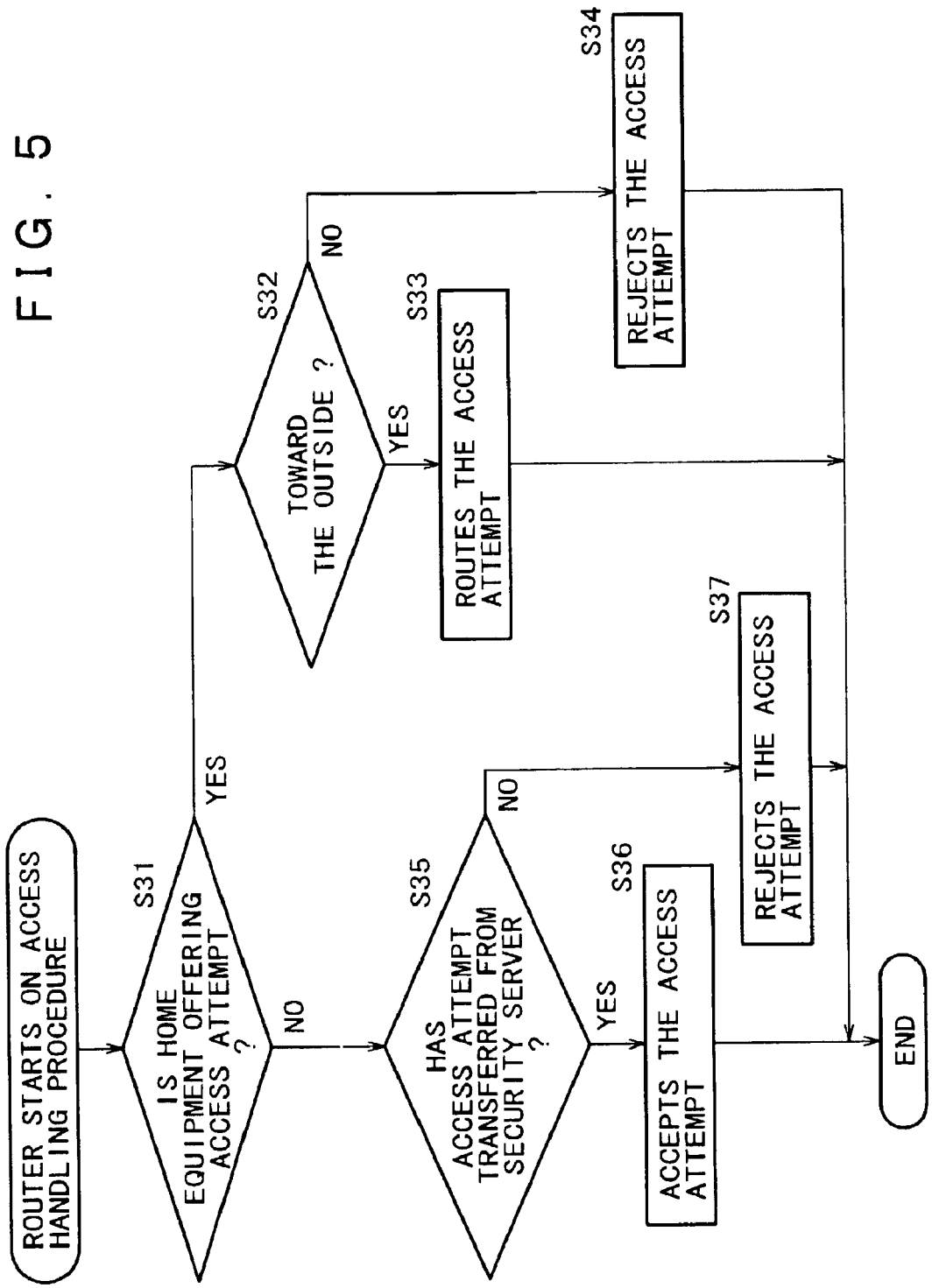
FIG. 5 is a flowchart explaining an access handling procedure to be executed by a router.

The router 61 executes an access handling procedure that is summarized in a flowchart shown in FIG. 5.

In step S31, the router 61 determines whether the home equipment is offering an access attempt. If the home equipment is offering an access attempt, the router not receiving an access attempt to the equipment, the router 61 goes to step S32 and determines whether the home equipment is offering the access attempt toward the outside. If the home equipment is offering the access attempt toward the outside, the router 61 goes to step S33 and routes the access attempt to its destination. This processing corresponds to routing the access attempt through the path N2, for example.

If, at the step S32, it is determined that the home equipment is offering the access attempt toward another node within the community area network, the router 61 goes to step S34 and rejects the access attempt. This processing corresponds to the rejection of access through the path N11, for example.

If, at the step S31, it is determined that the router is receiving an access attempt to the home equipment, the router 61 goes to step S35 and determines whether the access attempt has been transferred from the security server 11-1. If the access attempt has been transferred from the security server 11-1, the router 61 goes to step S36 and accepts the access attempt. This access attempt corresponds to the access attempt carried across the path N 42 and the path N9, for example.

If, at the step S35, it is determined that the router receives the access attempt not transferred from the security server 11-1, the router 61 goes to step S37 and rejects the access attempt. This access attempt corresponds to the access attempt carried across the path N3, for example.

Figure 6:
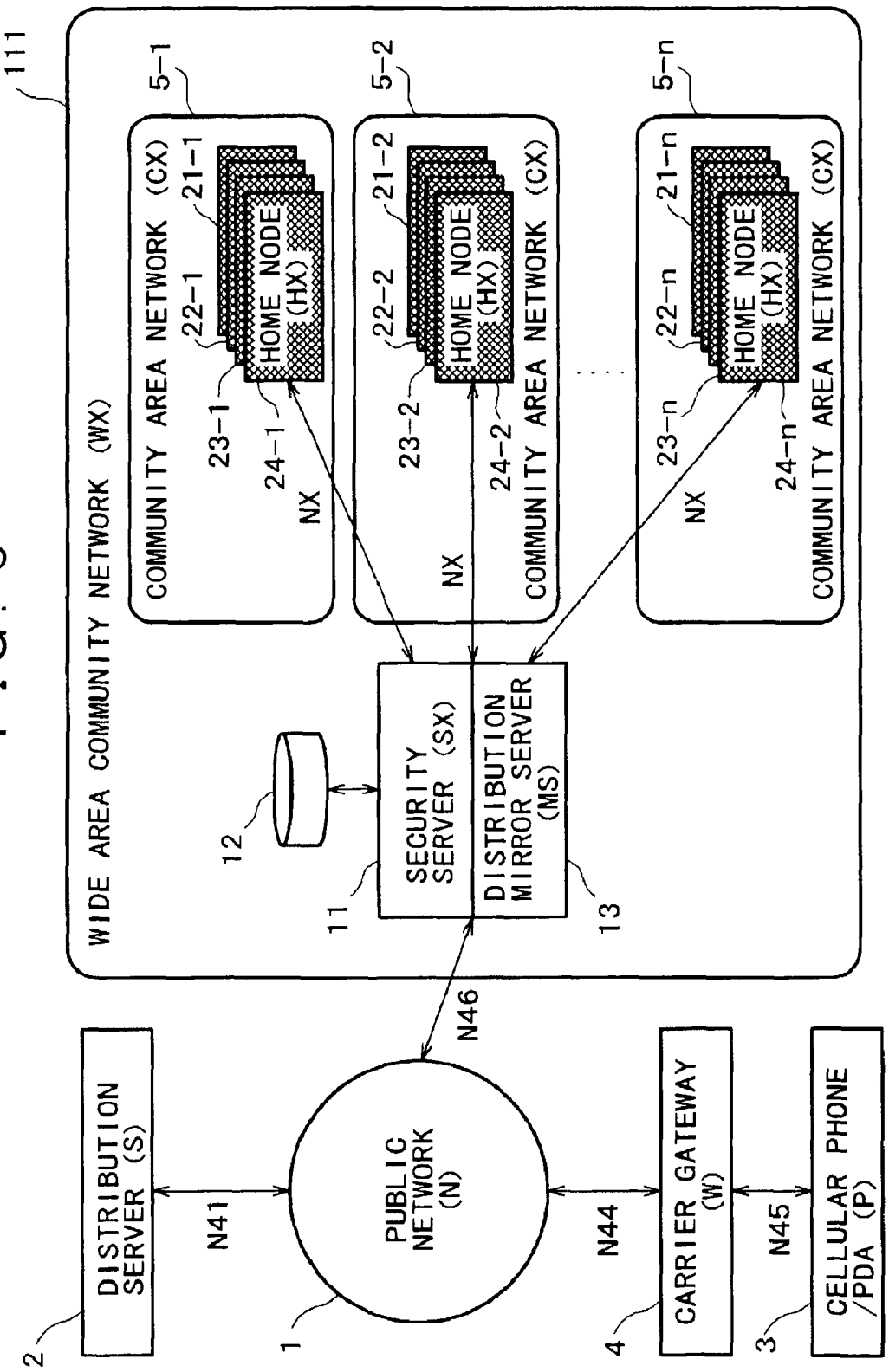
FIG. 6 is a block diagram showing a wide area community network to which the present invention is applied.

FIG. 6 represents another network system example wherein a wide area community network 111 covering a larger area is used as an inward network. The wide area community network 111 is comprised of a plurality of community area networks 5-1 to 5-n. A database 12, a security server 11, and a distribution mirror server 13 are shared across the plurality of community area networks 5-1 to 5-n.

Figure 7:
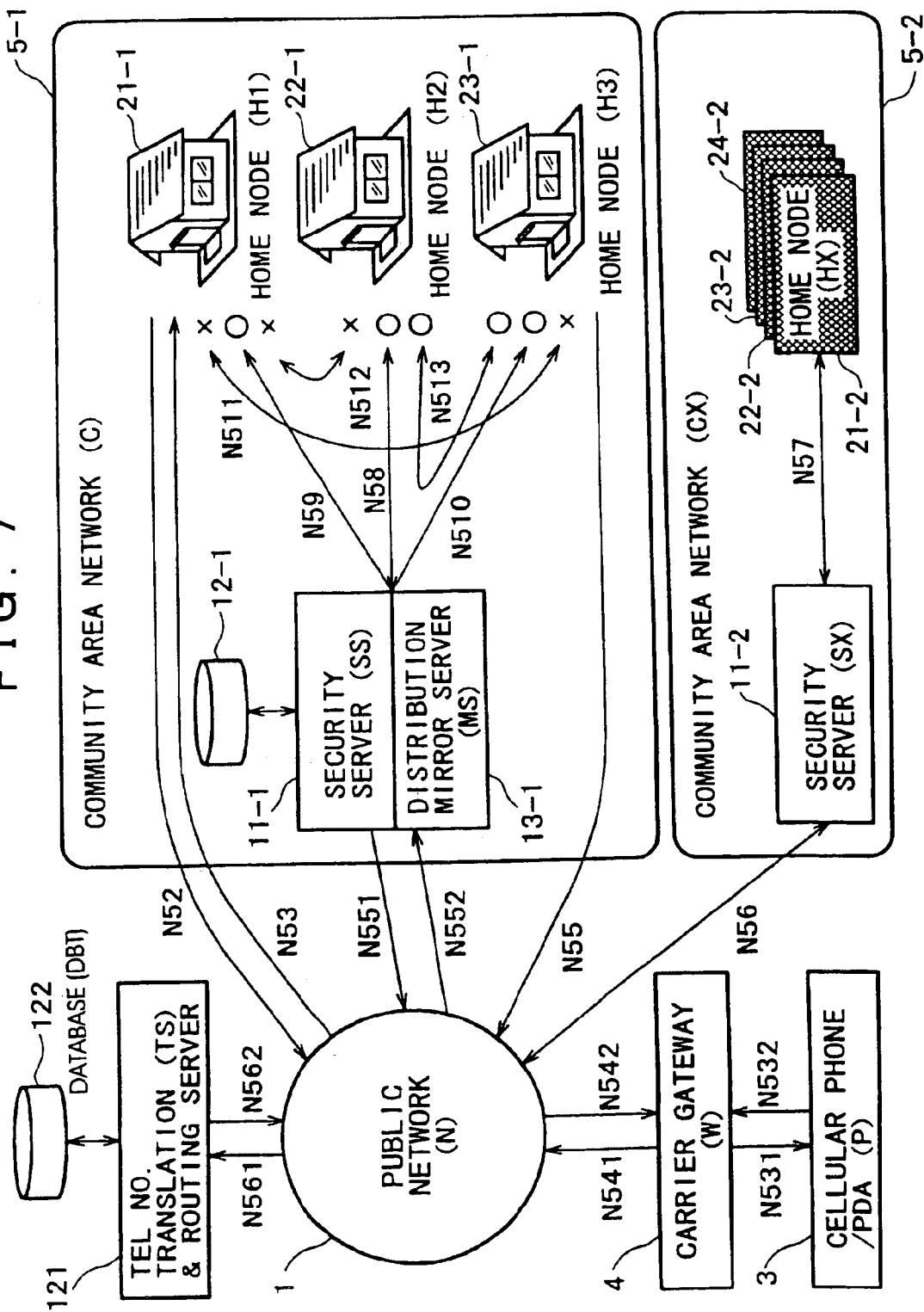
FIG. 7 is a diagram explaining a communication procedure.

FIG. 7 represents yet another network system example wherein a telephone number conversion and routing server 121 is incorporated into the system structure so that telephone users can easily take advantage of VoIP telephonic communication via networks.

Normally, the VoIP requires telephone users to specify an IP address by which a communication path is established to connect a call. However, IP addresses are hard to remember and not generally pervaded for telephony and they change, according to the connection mode. Thus, ITU-T E.164 or the like is used.

In FIG. 7, when a VoIP-compliant telephone 66 connected to the home node 21-1 offers a call attempt to a similar telephone connected to the home node 23-1 by entering the telephone number, the call attempt is transferred across a path N52, the public network 1, and a path N561 to the telephone number conversion and routing server 121. On this server, call connection setup processing is executed.

The telephone number conversion and routing server 121 translates the telephone number into IP address, based on the mapping information registered in its database 122. Then, the server 121 connects the call attempt to the VoIP-compliant telephone connected to the home node 23-1 via a path N562, the public network 1, a path N522, the security server 11-1, and a path N510.

In this case, the security server 11-1 retrieves information about the VoIP-compliant telephone connected to the home node 23-1 from the database 12-1 and sends back a reply as a proxy for the VoIP-compliant telephone connected to the home node 23-1.

In environment where IP addresses change, it is necessary to provide means for dynamically updating the mapping between a telephone number and an IP address registered on the database of the telephone number conversion and routing server 121 from a VoIP-compliant telephone or its proxy.

As explained in the described embodiments, the security server 11, database 12, and distribution mirror server 13 are provided per community area network 5 or wide area community network 111 which is an inward network, so that each home node can keep connecting to the outside network all the time with security assured, wherein users at home need not take security measures separately, based on technical expertise thereof.

Accordingly, the present invention is applicable to building a network that makes it possible to offer the following services:

(1) Security-related Service

Information: Network security service without requiring network service users at home to provide their machine and system with a firewall.

Crime prevention: The following service is implemented. Should an abnormal event in view of crime prevention be detected, notification thereof is automatically transmitted to the appointed address or number to contact and a police box, a police station, and the like in the community.

Safety: Mutual assistance service in a community. Trouble of emergency happened in a home (should gas leaking or a fire be detected or in case of sudden illness) is reported to the appointed neighboring home node(s) and equipment(s).

(2) Access Service From Outdoors

Secure connection service from a mobile terminal such as a portable phone or PDA operating outdoors to the home node.

(3) VoIP Telephony Service

Network-oriented telephony service in which VoIP is easier to use. By telephone number to IP address conversion and the security server's proxy function, call connection across networks can be made by specifying a telephone number.

(4) Advertising or Public Relations Distribution Service

A service of distributing localized advertising or public relations by push-type distribution, using the distribution mirror server in the community network.

(5) Information Service from a Government Office

A service of distributing information from a government office and disasters information such as emergency warning or alerts by push-type distribution.

INDUSTRIAL APPLICABILITY

Even when general household computers and equipment keep connecting to a public network such as the Internet all the time, users can take advantage of security-assured network environment without being conscious of security and learning security expertise.

By providing security-assured access environment for access using a mobile terminal such as a cellular phone or PDA operating outdoors to an intra-home network, remote supervision and operation of intra-home computers and equipment and communication with them can be performed. Communication can be used for measures for crime prevention, safety, and emergency such as sudden illness and seamless transmission of kinds of data can be carried out.

By defining network coverage such as a community area network, the network situation or state can easily be grasped and stable system operation and security can be assured.

By permitting connection through a specific path from a security server or the like, remote setting and maintenance of a connection device such a router can be performed with security maintained.

In the same manner as described above, remote maintenance of an intra-home network device or the like can be performed with security maintained.

What is claimed is:

1. A home network system including a second internal network connecting to a first external network, said network system comprising:

detection means for detecting a direction of access between said first network and said second network;

storage means for storing information required for executing an authentication process;

authentication means for executing the authentication process based on the information stored in said storage means when said detection means detects an access attempt in a direction from said first network toward said second network and for skipping the authentication process when said detection means detects an access attempt in a direction from said second network toward said first network; and control means for controlling connection of an access attempt from said first network toward the second network, according to a result of the authentication process executed by said authentication means.

2. The home network system as recited in claim 1, wherein said control means controls connection using a virtual private network technique.

3. The home network system as recited in claim 1, wherein said second network accommodates a plurality of home nodes of individual networks formed inside each home.

4. The home network system as recited in claim 3, wherein said individual networks formed inside each home include one of Ethernet and a IEEE1394 bus.

5. The home network system as recited in claim 3, wherein said storage means further stores information required for push-type distribution of information received across said first network to the home nodes over said second network.

6. The home network system as recited in claim 5, wherein information to be distributed by the push-type distribution includes one of advertising and public relations, information from a government office, disasters information, and emergency information.

7. The home network system as recited in claim 1, wherein said authentication means executes said authentication process using one of a telephone number and a device ID obtained from a wireless mobile device.

8. A connection control method in a home network system, including a second internal network connecting to a first external network, said connection control method comprising the steps of:

detecting a direction of access between said first network and said second network;

storing beforehand information required for executing an authentication process;

executing the authentication process based on the information stored in said step of storing upon a detection of an access attempt in a direction from said first network toward said second network and for skipping the authentication process upon a detection of an access attempt in a direction from said second network toward said first network; and controlling a connection of an access attempt from said first network toward said second network according to a result of the authentication process.

* * * * *